(12) United States Patent
Gebhart

(10) Patent No.: US 8,678,156 B2
(45) Date of Patent: Mar. 25, 2014

(54) SHIFTABLE FRICTION CLUTCH FOR ACTUATION WITH A FLOWABLE PRESSURE MEDIUM

(75) Inventor: Manfred Gebhart, Constance (DE)

(73) Assignee: Kendrion Linnig GmbH, Markdorf (DE)

( * ) Notice: Subject to any disclaimer, the term of this patent is extended or adjusted under 35 U.S.C. 154(b) by 177 days.

(21) Appl. No.: 13/122,329

(22) PCT Filed: Aug. 27, 2010

(86) PCT No.: PCT/EP2010/005255
§ 371 (c)(1),
(2), (4) Date: Apr. 1, 2011

(87) PCT Pub. No.: WO2011/023393
PCT Pub. Date: Mar. 3, 2011

(65) Prior Publication Data
US 2011/0278127 A1    Nov. 17, 2011

Related U.S. Application Data

(60) Provisional application No. 61/286,593, filed on Dec. 15, 2009.

(30) Foreign Application Priority Data

Aug. 27, 2009    (DE) .......................... 10 2009 038 767

(51) Int. Cl.
*F16D 25/0632*    (2006.01)
*F16D 29/00*    (2006.01)
*H02K 49/04*    (2006.01)

(52) U.S. Cl.
USPC ................... 192/48.2; 192/85.21; 192/85.37; 192/66.22; 310/105

(58) Field of Classification Search
USPC ............... 192/66.22, 85.21, 85.37, 48.2, 48.3
See application file for complete search history.

(56) References Cited

U.S. PATENT DOCUMENTS

| | | | | |
|---|---|---|---|---|
| 2,637,308 A | * | 5/1953 | Dodge | 123/41.08 |
| 2,661,148 A | * | 12/1953 | Englander | 416/32 |
| 3,382,852 A | * | 5/1968 | De Lorean | 417/223 |
| 3,477,313 A | * | 11/1969 | Ringe | 475/142 |
| 3,684,397 A | * | 8/1972 | Elmer | 416/39 |
| 3,985,214 A | * | 10/1976 | Hall et al. | 192/85.53 |
| 4,541,516 A | * | 9/1985 | Fenzel | 192/85.53 |
| 5,052,843 A | | 10/1991 | Maurer | |
| 5,994,810 A | * | 11/1999 | Davis et al. | 310/105 |
| 6,237,432 B1 | * | 5/2001 | Vilou | 74/7 C |
| 6,838,796 B1 | * | 1/2005 | Nelson | 310/105 |
| 2006/0201773 A1 | * | 9/2006 | Swanson et al. | 192/91 A |

(Continued)

FOREIGN PATENT DOCUMENTS

| | | |
|---|---|---|
| DE | 2553368 | 11/1975 |
| DE | 4005965 | 2/1990 |

(Continued)

*Primary Examiner* — Rodney Bonck
*Assistant Examiner* — Lillian Nguyen
(74) *Attorney, Agent, or Firm* — Bachman & LaPointe, P.C.

(57) ABSTRACT

The invention relates to a shiftable friction clutch (1a, 1b) for actuation with a pressure medium. Clutches of this type can be used, for example, to drive auxiliary assemblies such as fans (22) in vehicle construction. An especially compact construction is achieved through the use of a disk spring (6). A production method is furthermore proposed.

19 Claims, 3 Drawing Sheets

(56) References Cited

U.S. PATENT DOCUMENTS

2009/0101452 A1    4/2009  Zimmer et al.
2009/0183963 A1    7/2009  Swanson et al.
2010/0044176 A1*   2/2010  Daniel .................... 192/3.29
2010/0282562 A1*  11/2010  Swanson et al. ............ 192/52.5

FOREIGN PATENT DOCUMENTS

| DE | 10060684 A1 | 12/2000 |
| GB | 854384 A | 11/1960 |
| GB | 2204101 A | 11/1988 |
| WO | 2007121730 A2 | 11/2007 |

* cited by examiner

SHIFTABLE FRICTION CLUTCH FOR ACTUATION WITH A FLOWABLE PRESSURE MEDIUM

BACKGROUND OF THE INVENTION

The invention relates to a shiftable friction clutch and to a method for producing a shiftable friction clutch.

Shiftable friction clutches actuated by a flowable pressure medium are known in various embodiments, in particular from vehicle technology. Such shiftable friction clutches are sometimes used to couple fans or cooling or lubrication pumps in a shiftable manner to the engine shaft. Clutches of this kind must, on the one hand, operate very reliably and, on the other, must be built as compactly is possible. In this regard the accommodation of a working chamber for a pressure medium, which should be as fluid-tight as possible, presents a particular design challenge. In addition, a resilient element which counteracts the expansion of the pressure medium must be accommodated within such a shifting device, which has a number of reciprocally moving parts.

SUMMARY OF THE INVENTION

It is the object of the invention to provide a clutch which has a comparatively simple and space-saving structure.

This object is achieved by a shiftable friction clutch with the features described herein.

Advantageous and useful developments of the invention are also specified.

The invention is based on a shiftable friction clutch for actuation with a flowable pressure medium, which includes two coupling elements which are mounted rotatably about the same axis and are able to be brought into frictional contact with one another in order to transmit a rotary motion, and a pressure chamber located in the clutch, the volume of which is variable by means of an axially movable piston, the piston being held in a predefined position by the force of a spring. The pressure chamber serves to receive a flowable pressure medium with which the piston can be displaced by a pressure increase against the force of the spring, and the clutch can thereby be either engaged or disengaged. The spring is a disk spring.

Especially as a result of their shallow construction, disk springs offer the advantage that they require comparatively little space in the axial direction of the axis of rotation of the clutch. In particular, annular disk springs, with their concentrically arranged edges, the inner or outer of which edges can be firmly clamped, are especially well adapted to the geometry of a clutch. Given the predefined shape of the disk spring, further parameters may be selected, such as material, material thickness and incisions in the spring surface with which both the spring rate and the spring travel can be adjusted. As a result, a clutch according to the invention can advantageously be adapted to different requirements with slight changes, or no changes, to its dimensions. Because planar resilient sections, or a plurality of resilient sections connected in parallel, contribute to the spring effect of disk springs, the springs offer greater reliability and lower susceptibility to failure in comparison to spiral springs, for example.

The spring is mounted inside the pressure chamber. This has the advantage that no separate location needs to be provided for installing the resilient element of the clutch. In addition, the spring travel lies within the expansion space of the pressure medium, in which the piston is easily accessible for cooperation with a spring. By accommodating the spring, in particular the disk spring, within the pressure chamber, an inventive shiftable friction clutch implemented in this way offers the advantage of an especially compact construction.

The essence of the invention is that the disk spring pulls an outer coupling element towards an inner coupling element, so that conical friction surfaces come into frictional contact with one another.

A shiftable friction clutch according to the invention advantageously has a mechanical stop configured in such a manner that the mechanical stop limits an axial displacement of the piston brought about by the flowable pressure medium to a predefined maximum volume of the pressure chamber which receives the pressure medium. Such a mechanical stop restricts the spring travel, and therefore advantageously prevents possible excessive elongation of the disk spring. In particular, if the mechanical stop arrests the displacement of the piston at a comparatively large distance from the axis of rotation of the clutch and symmetrically thereto, the mechanical stop can stabilize the position of the piston when under pressure. The mechanical stop can thereby advantageously reduce out-of-balance mass during operation of the clutch.

A preferred configuration of the invention provides that the surfaces of the coupling elements which are able to come into frictional contact with one another in order to transmit a rotary motion have a conical configuration with respect to the axis of rotation. With conical friction surfaces, as compared to flat friction surfaces disposed perpendicularly to the axis of rotation of the clutch, the height of the shiftable friction clutch along the axis of rotation of the clutch can advantageously be utilized to increase the surface area involved in the frictional connection. In addition, conical friction surfaces have the advantage that the drive and output elements of the clutch are centered with respect to one another when the clutch is engaged. Because of the conical effect with which the two conical friction surfaces engage in one another, the torque transmission is less susceptible to vibrations and shocks acting perpendicularly to the axis of rotation.

It is especially preferred that the surfaces of the coupling elements which are able to come into frictional contact with one another in order to transmit a rotary motion have, when without frictional contact, an axial overlap region with respect to the axis of rotation, viewed radially towards the outside. Such an axial overlap region, in which one coupling element encircles the other, offers advantageous protection against the penetration of contaminants into the interior of the clutch. Furthermore, an axial overlap region ensures that the clutch can be securely engaged even with out-of-balance forces acting on at least one coupling element, for example as a result of bearing damage.

A preferred configuration of the invention provides that a transmission of torque takes place at the friction surfaces if the force exerted on the piston by the pressure medium is smaller than the force of the disk spring by which the friction surfaces are pressed against one another. The clutch can therefore be disengaged only when the pressure medium is pressurized sufficiently strongly. Such a mode of operation offers the advantage that assemblies which must reliably continue to operate remain connected by the clutch even if the pressure medium can no longer be pressurized.

A further preferred configuration of the invention is distinguished by the fact that a transmission of torque takes place at the friction surfaces if the force exerted on the piston by the pressure medium is greater than a force of the disk spring by which the friction surfaces are held out of contact. This means that the pressure medium is pressurized only in order to engage the clutch. Such a configuration of the invention has the advantage that auxiliary assemblies in a vehicle, support from which is required only sporadically and usually for short periods, require the clutch to be pressurized only in these periods. In the disengaged state the clutch itself is unpressurized and during this time the auxiliary assembly consumes no mechanical power of the drive, for example of an internal combustion engine.

It is further preferred that the coupling elements have permanent magnets in order to transmit a rotary motion, so that transmission of a rotary motion can take place without frictional contact between the coupling elements, on the principle of an eddy current clutch. A rotary motion can thereby advantageously be transmitted even in the disengaged state of the clutch according to the invention. This makes it possible, for example, to drive assemblies such as a fan, which must move throughout an operating time of an engine, although a maximum rotational speed of the mechanically engaged state is required only infrequently.

The friction surfaces of the coupling elements preferably consist of steel. Especially if the coupling elements having the friction surfaces are made of steel, the complexity and cost of producing the coupling elements can advantageously be reduced by this configuration of the invention. Moreover, this has the advantage of comparatively low wear of the friction surfaces, especially if only a comparatively small torque is required for driving, for example, a fan wheel in the engine compartment, in the engaged mode.

BRIEF DESCRIPTION OF THE DRAWINGS

Two exemplary embodiments and the production method of the shiftable friction clutch according to the invention are described with reference to the drawings, further features and advantages of the invention being explained. In the drawings.

Figure 1:
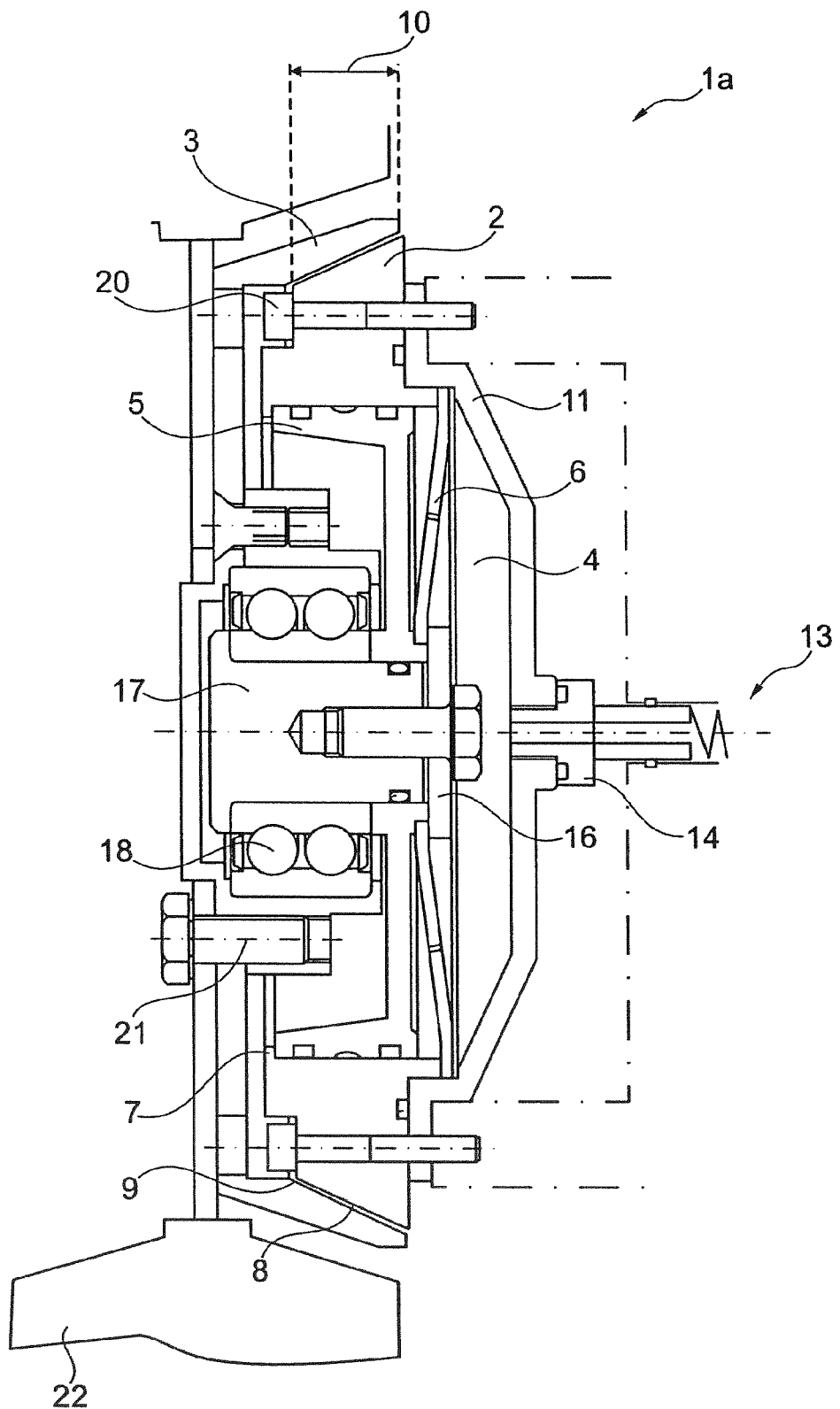
FIG. 1 shows a schematic section through a shiftable friction clutch according to the invention with fan for a blower of an internal combustion invention of a vehicle.

Where appropriate, the reference numerals are used in a uniform manner in both figures.

DETAILED DESCRIPTION

FIG. 1 shows a pneumatically actuatable fan clutch 1a. A fan wheel 22 is fastened with a plurality of fastening screws 21 to an outer coupling element 3. An inner coupling element 2 is screwed to a cover 11 by means of fastening screws 20. In this case the threads of the fastening screws 20 project beyond the cover 11, so that this part of the clutch 1 can be screwed to a drive element, for example a belt pulley.

A rotary leadthrough 14 conducts a pressure medium line 13 through the cover 11. Together with a piston 5, the inner coupling element 2 and the cover 11 form a pressure chamber 4. The pressure chamber 4 receives compressed air which is supplied via the line 13.

Inside the pressure chamber 4 a disk spring 6 is clamped by its outer edge between the cover 11 and the inner coupling element 2. At its inner edge the annular disk spring 6 is clamped between the piston 5 and a spring securing plate 16, which in turn is screwed to a bearing pin 17. The outer coupling element 3 is mounted rotatably about the axis of rotation of the clutch by means of a ball bearing 18.

The disk spring 6 pulls the outer coupling element 3 towards the inner coupling element 2 via the spring securing plate 16, the bearing pin 17 and the ball bearing 18, so that the conical friction surfaces 8 and 9 come into frictional contact with one another. Without excess pressure in the pressure chamber 4, therefore, the clutch 1 is in the engaged state brought about by the disk spring 6.

By supplying compressed air via the line 13 and the rotary leadthrough 14, the pressure in the pressure chamber 4 is increased and the piston 5 is displaced against the force of the spring 6. As this happens, the friction surfaces 8 and 9 of the inner 2 and outer 3 coupling elements are separated from one another. Through the loss of the mechanical frictional contact at the friction surfaces, only a significantly reduced torque can now be transmitted via the friction in the ball bearing 18. As a result, the fan wheel 22 is set in motion only very slowly, or not at all, with respect to a drive element.

The piston travel is limited by the stop 7. The latter stabilizes the piston 5 and therefore the position of the bearing pin 17, of the ball bearing 18 and finally of the outer coupling element 3. The forces exerted on the piston 5 by these clutch parts are therefore absorbed not only by the cylindrical walls of the piston 5 and of the pressure chamber 4. This has the advantage that both the piston 5 and the pressure chamber 4 can be constructed with a comparatively low depth in relation to their diameter.

Figure 2:
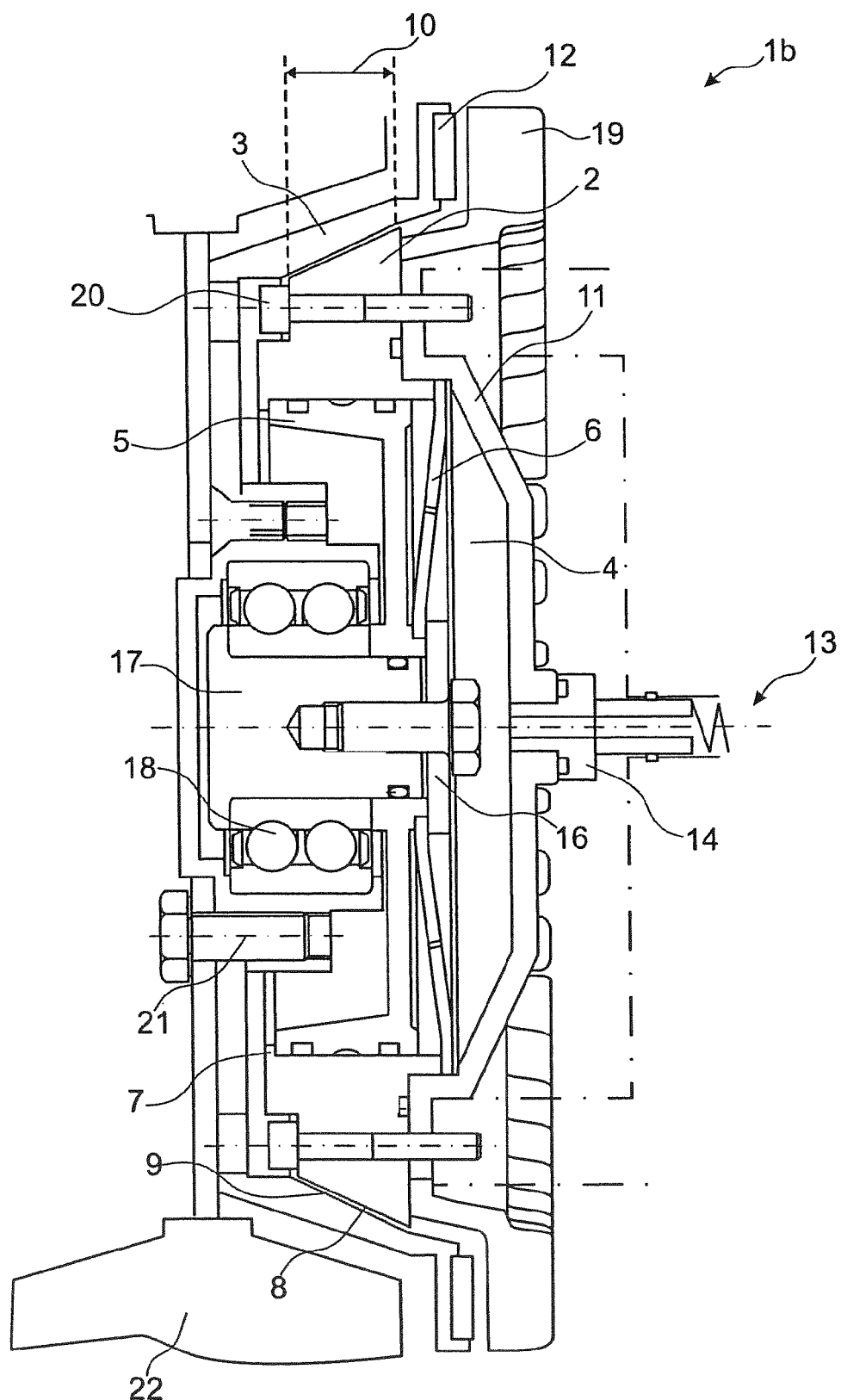
FIG. 2 shows a schematic section through a shiftable friction clutch according to the invention with eddy current drive.

FIG. 2 shows a further configuration of a pneumatically actuatable fan clutch 1b according to the invention which, however, additionally has an eddy current drive. For this purpose, a ring on which a plurality of permanent magnets 12 are arranged, preferably symmetrically about the axis of rotation, is located on the outer edge of the coupling element 3. Located opposite the permanent magnets 12 on the coupling element 3 in the axial direction is a ring 19 with cooling fins, which forms the outer edge region of the cover 11 and is connected to the inner coupling element 2.

The cover 11 is produced from a metal with high electrical conductivity, preferably aluminum. The permanent magnets 12 induce eddy currents in the metal conductive material of the cooling fin ring 19, so that the outer coupling element 3 is entrained in the direction of rotation of the inner coupling element 2 by electromagnetic forces on the principle of an eddy current clutch.

If the clutch 1b is always actuated with a pressure increase which is sufficient to displace the piston 5 against the stop 7, this configuration of the invention offers the possibility of setting two different rotational speeds of the fan wheel 22. Because, in this case, the eddy current drive is operated with a constant distance between the permanent magnets 12 and the cooling fin ring 19, the dimensions of the cooling fin ring 19 can be adjusted comparatively more precisely to a heat dissipation rate appropriate to the application.

The electromagnetic force of the eddy current clutch may basically be made adjustable for speed adaptation of the coupling element on which the fan 22 is arranged.

The magnetic force may be adjusted by varying one or more of the following options:

a) The number of magnets used in the eddy current system;
b) The size of the air gap of the eddy current system, that is to say the air gap between a section on the cooling fin ring 19 in which the eddy current zone is formed and the outer coupling element 3 which bears the magnets 12;
c) The strength of the magnets 12 which are used.

In the exemplary embodiment of FIGS. 1 and 2, a movement distance between the inner coupling element and the outer coupling element 3 between the non-engaged and engaged states may be 1.5 mm when the clutch is new, and may increase up to 3.7 mm, for example, at the end of the clutch service life, without the function of the clutch being impaired. The exemplary embodiment is for example designed for providing a force of the disk spring of 2000 Newtons, as a result of which over 600 Newton meters is still available as a static torque at the end of the service life of the clutch. The static torque in, for example, a new, unworn state of the friction surfaces (8, 9) may be approximately 1100 Nm. The maximum shiftable torque is approximately 280 Newton meters. With a lever length of approximately 0.5 meter, the force is then approximately 560 Newtons. The input speed may be approximately 3000 revolutions per minute, wherein a slip speed of the eddy current system in the cold state may be approximately 500-1200 revolutions per minute depending on the fan load. In a new state of the clutch, the pressure in the pressure chamber during the opening of the clutch should be 4-5 bar.

The discussed parameters serve merely as an example and may vary, without departing from the subject matter of the application.

The transmissible torque of the friction shift clutches 1*a*, 1*b* is dependent on the friction surface area and on the angle of the conical friction surfaces (8, 9).

The force of the disk spring 6 may likewise be varied in order to be able to influence the shift behaviour of the shifted and non-shifted clutch, or the transmissible torque in the non-shifted state.

It is especially preferred that the surfaces of the coupling elements (2, 3) which are able to come into frictional contact with one another in order to transmit a rotary motion have, when without frictional contact, an axial overlap region (10) with respect to the axis of rotation, viewed radially towards the outside. Such an axial overlap region (10), in which one coupling element (3) encircles the other, offers advantageous protection against the penetration of contaminants into the interior of the clutch. Furthermore, an axial overlap region ensures that the clutch can be securely engaged even with out-of balance forces acting on at least one coupling element, for example as a result of bearing damage.

Figure 3:
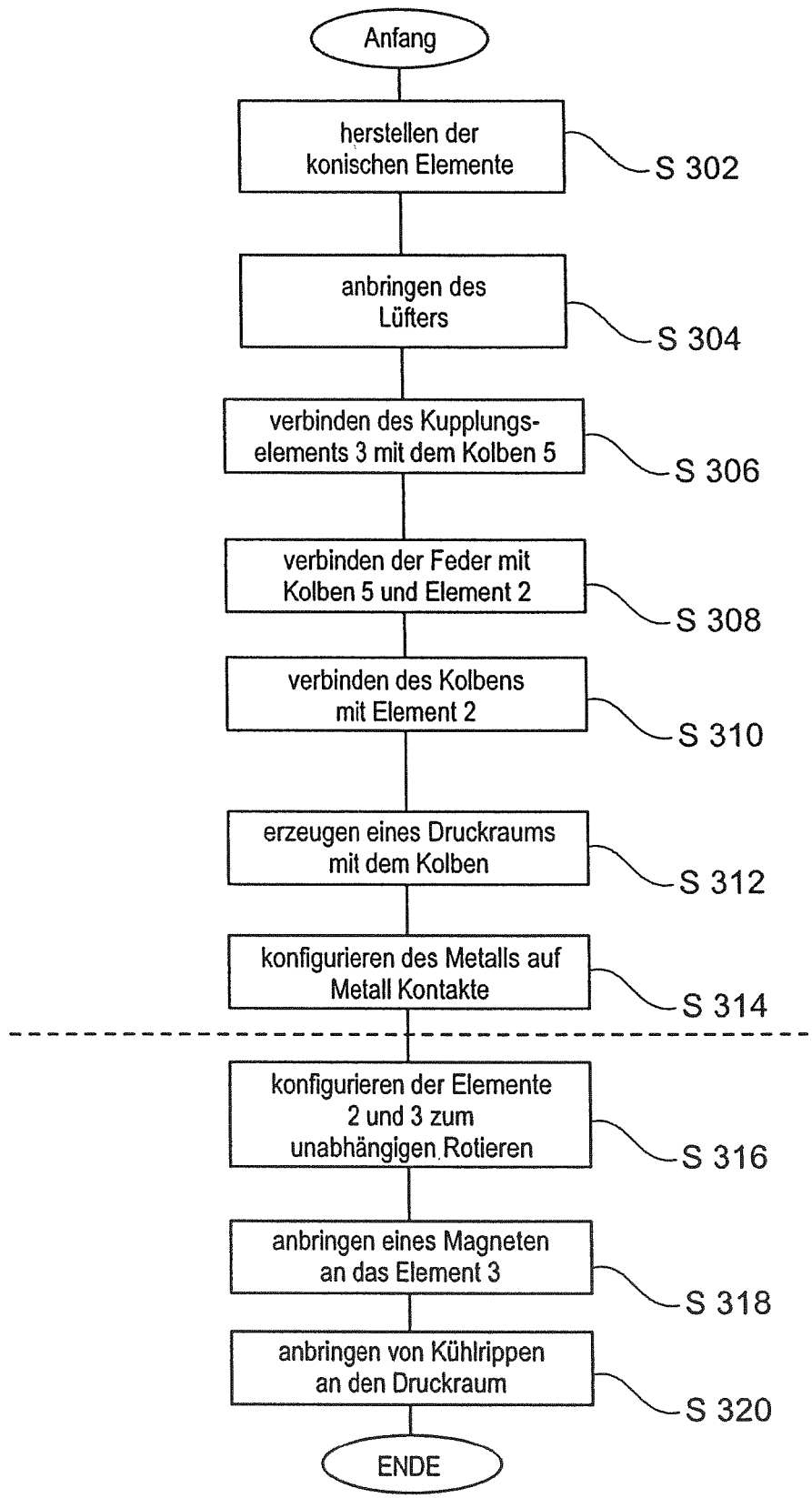
FIG. 3 shows a flow diagram which illustrates the production of the shiftable friction clutch.

FIG. 3 diagrammatically illustrates, in the form of a flow diagram, a method for producing the friction shift clutches 1*a*, 1*b*.

The steps above the dashed line may be used to produce a single-stage clutch 1*a*. The additional steps below the dashed line may then be carried out to provide a two-stage clutch 1*b* with an eddy current drive.

First and second conical metal parts 2, 3 are firstly produced in step S 302. In step S 304, a fan holder section is mounted on an outer surface of the outer coupling element 3. In step S 306, the outer coupling element 3 is connected to the piston 5.

In steps S 308, S 310, S 312, S 314, the disk spring 6 is connected to the inner coupling element 2 and to the piston 5, and the piston is inserted.

In step S 316, the inner coupling element 2 and the outer coupling element 3 are configured such that they can rotate independently of one another. In steps S 318 and S 320, the inner coupling element 2 is provided with permanent magnets 12, and the outer coupling element 3 is provided with the cooling fin ring 19.

The invention claimed is:

1. Shiftable friction clutch (1*a*, 1*b*) for actuation with a flowable pressure medium, comprising two coupling elements (2, 3) which are mounted rotatably about the same axis of rotation and are able to be brought into frictional contact with one another in order to transmit a rotary motion, and a pressure chamber (4) located in the clutch (1*a*, 1*b*), the volume of which pressure chamber (4) is variable by means of an axially movable piston (5), the piston (5) being held in a predefined position by the force of a disk spring (6) which is mounted inside the pressure chamber, wherein the disk spring (6) pulls an outer coupling element, so that conical friction surfaces of the coupling elements (2, 3) come into frictional contact with one another.

2. Shiftable friction clutch (1*a*, 1*b*) according to claim 1, wherein a mechanical stop (7) is configured in such a manner that the mechanical stop (7) limits an axial displacement of the piston (5) brought about by flowable pressure medium to a predefined maximum volume of the pressure chamber (4) which receives the pressure medium.

3. Shiftable friction clutch (1*a*, 1*b*) according to claim 2, wherein the friction surfaces (8, 9) of the coupling elements (2, 3) which are able to come into frictional contact with one another in order to transmit a rotary motion have, when without frictional contact, an axial overlap region (10) with respect to the axis of rotation.

4. Shiftable friction clutch (1*a*, 1*b*) according to claim 1, wherein the friction surfaces (8, 9) of the coupling elements (2, 3) which are able to come into frictional contact with one another in order to transmit a rotary motion have a conical configuration with respect to the axis of rotation.

5. Shiftable friction clutch (1*a*, 1*b*) according to claim 1, wherein a transmission of torque takes place at the friction surfaces (8, 9) if the force exerted by the pressure medium on the piston (5) is smaller than a force of the disk spring (6) by which the friction surfaces (8, 9) are pressed against one another.

6. Shiftable friction clutch (1*a*, 1*b*) according to claim 1, wherein a transmission of torque takes place at the friction surfaces (8, 9) if the force exerted by the pressure medium on the piston (5) is greater than a force of the disk spring (6) by which the friction surfaces (8, 9) are held at a contactless distance from one another.

7. Shiftable friction clutch (1*a*, 1*b*) according claim 1, wherein one of the coupling elements (2, 3) has permanent magnets (12) in order to transmit a rotary motion, so that a transmission of a rotary motion can take place without frictional contact between the coupling elements (2, 3), on principle of an eddy current clutch (12, 19).

8. Shiftable friction clutch (1*a*, 1*b*) according to claim 1, wherein the friction surfaces (8, 9) of the coupling elements (2, 3) consist of steel.

9. Shiftable friction clutch (1*a*, 1*b*) for actuation with a flowable pressure medium, comprising two coupling elements (2, 3) which are mounted rotatably about the same axis of rotation and are able to be brought into frictional contact with one another in order to transmit a rotary motion, and a pressure chamber (4) located in the clutch (1*a*, 1*b*), the volume of which pressure chamber (4) is variable by means of an axially movable piston (5), the piston (5) being held in a predefined position by the force of a disk spring (6), wherein the disk spring (6) is mounted inside the pressure chamber (4), wherein a fan holder is attached to an outer coupling element (3) of the two coupling elements (2, 3), and wherein the friction surfaces (8, 9) of the coupling elements (2, 3), which are able to come into frictional contact with one another in order to transmit a rotary motion have a conical configuration with respect to the axis of rotation.

10. Method for producing a shiftable friction clutch, which method comprises the following steps:
producing an inner coupling element (2) and an outer coupling element (3), each coupling element having an inner and an outer surface,
attaching a fan holder to the outer surface of the outer coupling element (3), connecting at least a part of a second end of a piston (5), which has a first end and a second end, to at least one part of the inner surface of the outer coupling element (3), connecting at least one part of the first end of the piston (5) to at least one part of the inner surface of the inner coupling element (2), connecting at least one part of a first end of a disk spring, which has the first end and a second end, to at least one part of the first end of the piston (5), and connecting at least one part of the second end of the disk spring (6) to at least one part of the inner surface of the inner coupling element (2), producing a pressure chamber (4) with at least one part of the first end of the piston (5), and coordinating the inner coupling element (2) with the outer coupling element (3) such that an inner conical friction surface (8) can come into metal-to-metal frictional contact with an outer conical friction surface (9).

11. Method according to claim 10, wherein, in a further step, the piston (5) is configured in such a manner that the inner conical friction surface (8) and the outer conical friction surface (9) can move axially relative to one another.

12. Method according to claim 10, wherein, in a further step, the disk spring (6) is preloaded in such a manner that the disk spring pulls the outer coupling element (3) towards the inner coupling element (2) and therefore the outer conical friction surface (9) towards the inner conical friction surface (8).

13. Method according to claim 10, wherein the fan is mounted on the outer coupling element (3) on a holder.

14. Method according to claim 10, wherein the disk spring (6) and the piston (5) are arranged on the inner coupling element (2) and on the outer coupling element (3) respectively.

15. Method according to claim 10, wherein the inner conical friction surface (8) and the outer conical friction surface (9) are formed on the inner coupling element (2) and on the outer coupling element (3) respectively.

16. Method according to claim 10, wherein the conical friction surfaces (8, 9) are formed such that the angle of inclination of the respective cone is approximately 25 degrees.

17. Method according to claim 10, wherein elements of an eddy current drive are arranged on the inner and outer coupling elements.

18. Method according to claim 10, wherein magnets (12) are arranged on the outer coupling element (3) and eddy current regions are provided on the inner coupling element (2).

19. Method according to claim 10, wherein cooling fins are arranged on the inner coupling element (2).

* * * * *